United States Patent
Barrier (10) Patent No.: US 12,158,081 B2
(45) Date of Patent: Dec. 3, 2024

(54) FAIRING ELEMENT FOR SURROUNDING AN OBSTACLE IN A FLUID FLOW

(71) Applicant: OFFICE NATIONAL D'ETUDES ET DE RECHERCHES AÉROSPATIALES, Palaiseau (FR)

(72) Inventor: Raphaël Barrier, Palaiseau (FR)

(73) Assignee: OFFICE NATIONAL D'ETUDES ET DE RECHERCHES AÉROSPATIALES, Palaiseau (FR)

(*) Notice: Subject to any disclaimer, the term of this patent is extended or adjusted under 35 U.S.C. 154(b) by 0 days.

(21) Appl. No.: 18/025,956

(22) PCT Filed: Oct. 13, 2021

(86) PCT No.: PCT/FR2021/051783
§ 371 (c)(1),
(2) Date: Mar. 13, 2023

(87) PCT Pub. No.: WO2022/090643
PCT Pub. Date: May 5, 2022

(65) Prior Publication Data
US 2023/0358138 A1    Nov. 9, 2023

(30) Foreign Application Priority Data
Oct. 27, 2020  (FR) ........................ 2010999

(51) Int. Cl.
*F01D 5/14*    (2006.01)
*F01D 9/04*    (2006.01)

(52) U.S. Cl.
CPC ............ *F01D 5/143* (2013.01); *F01D 9/041* (2013.01); *F05D 2240/124* (2013.01); *F05D 2260/97* (2013.01)

(58) Field of Classification Search
CPC .............. F01D 5/14; F01D 9/041; F01D 9/06
See application file for complete search history.

(56) References Cited

U.S. PATENT DOCUMENTS

| 8,182,204 | B2* | 5/2012 | Durocher | F01D 5/142 |
| | | | | 415/115 |
| 2011/0225979 | A1* | 9/2011 | Hoeger | F01D 9/04 |
| | | | | 60/796 |

(Continued)

FOREIGN PATENT DOCUMENTS

| DE | 10 2008 060 847 | 6/2010 |
| EP | 3 121 383 | 1/2017 |

(Continued)

OTHER PUBLICATIONS

International Search Report for PCT/FR2021/051783, mailed Feb. 23, 2022, 4 pages.

(Continued)

*Primary Examiner* — Woody A Lee, Jr.
*Assistant Examiner* — Cameron A Corday
(74) *Attorney, Agent, or Firm* — NIXON & VANDERHYE (57) ABSTRACT

Disclosed is a fairing element intended to be placed in a passage for flow of a fluid, in order to surround an obstacle which crosses the passage so that the fairing element guides the flow of the fluid on two opposite sides of the obstacle. The fairing element is designed such that the pressure of the flowing fluid is constant or approximately constant in an upstream part of the suction surface of the fairing element. A fairing element of this kind can be incorporated into a stator of a turbomachine, in particular of an aircraft turbomachine.

20 Claims, 7 Drawing Sheets

(56) References Cited

U.S. PATENT DOCUMENTS

| | | | | |
|---|---|---|---|---|
| 2013/0051996 A1* | 2/2013 | Hoeger | .................... | F01D 9/06 |
| | | | | 415/185 |
| 2017/0022835 A1* | 1/2017 | Clark | ....................... | F01D 9/06 |
| 2019/0024521 A1* | 1/2019 | Hoeger | .................. | F01D 9/041 |

FOREIGN PATENT DOCUMENTS

| | | |
|---|---|---|
| EP | 3 431 708 | 1/2019 |
| EP | 3431708 A1 | 1/2019 |
| FR | 2019709 A1 | 7/1970 |

OTHER PUBLICATIONS

Written Opinion of the ISA for PCT/FR2021/051783, mailed Feb. 23, 2022, 6 pages.

* cited by examiner

FAIRING ELEMENT FOR SURROUNDING AN OBSTACLE IN A FLUID FLOW

This application is the U.S. national phase of International Application No. PCT/FR2021/051783 filed Oct. 13, 2021, which designated the U.S. and claims priority to FR Patent Application No. 2010999 filed Oct. 27, 2020, the entire contents of each of which are hereby incorporated by reference.

TECHNICAL FIELD

This description relates to a fairing element for surrounding an obstacle in a fluid flow, a turbomachine which incorporates such an element, as well as a method for manufacturing the fairing element.

PRIOR ART

In the field of guiding fluid flows, particularly in aeraulics and more particularly in the field of guiding air flows within turbomachines, it is often necessary to place an obstacle in a flow while interfering with this flow as little as possible in comparison to the nominal design. This nominal design may be the flow through an unobstructed section of a passage, i.e. with no obstacles. However, alternatively, the nominal flow can be in relation to a passage which is equipped with an element useful for the flow, such as an element which modifies a local velocity direction of the flow. In all cases, the fairing element has the function of dividing the flow between two sides of the obstacle, and this function of dividing the flow can possibly be combined with that of a useful element which is initially provided in the passage. For example, the fairing element can thus have the dual function of guiding the flow on two opposite sides of the obstacle, and of modifying the inclination of the flow. Such may be the case, in particular, of a stator which straightens the air flow passing through a turbomachine, for example an aircraft engine. Depending on the location of the stator in the turbomachine, the obstacle may be a structural support for part of the turbomachine, a mechanical transmission shaft which crosses the flow, a fuel line, a fastening bolt, etc.

However, a fairing element thus placed in a flow locally disrupts the pressure field within the flow, upstream of this fairing element. This disruption of the pressure field can then interfere with the operation of a rotor placed immediately before the stator relative to the direction of flow, and consequently can degrade the operation of the turbomachine. It can also cause unwanted acoustic emissions, due to the rapid movement of the rotor against the spatial variations in the pressure field which are caused by the fairing element upstream in the flow. It is then known to introduce a separation distance between the rotor and the fairing element, which is sufficient to reduce the interaction between the rotating rotor and the changes in the pressure field which are caused upstream by the fairing element. But such a separation distance increases the size and weight of the turbomachine, which is particularly detrimental in the case of an aircraft turbomachine.

Document FR 2,019,709 describes a turbomachine stator which comprises fairing elements called spacers, which are interposed between adjacent vanes of the stator. According to that document, a suction surface, or passive surface, of each spacer is practically flat and parallel to the direction of air circulation from a leading edge of the spacer which is oriented towards the upstream of the flow. In addition, the stator vanes are axially stepped between two successive fairing elements in addition to being spaced angularly apart from each other. However, the flat shape of the upstream part of the suction surface is appropriate only if the angle of incidence of the flow on the leading edge is constant all along this leading edge, and if there are no variations in cross-sectional area or in mean radius for the flow passage at the fairing element.

Documents EP 3,431,708 A1 and DE 10 2008 060847 A1 describe fairing elements to be placed around obstacles, which have surfaces facing towards the upstream of the flows considered, oriented substantially perpendicularly to these flows.

TECHNICAL PROBLEM

From this situation, an object of the present invention is to further reduce flow disruptions likely to be caused by the fairing element, compared to the nominal design of the flow.

In particular, an object of the invention is to reduce such disruptions caused by the fairing element in the pressure field within the fluid upstream of this fairing element.

Another object of the invention is to reduce a length of the fairing element parallel to the flow, for a given obstacle size, without increasing the flow disruptions produced by the fairing element.

SUMMARY OF THE INVENTION

To achieve at least one of these or other objects, a first aspect of the invention proposes a new fairing element intended for placement in a passage for flow of a fluid, and for surrounding an obstacle which crosses the passage so that the fairing element guides the flow of fluid on two opposite sides of the obstacle. This fairing element is designed for nominal values of several parameters of the flow, including at least a density of the fluid, respective variations in cross-sectional area and in mean radius of the passage along the flow, a direction of flow in the passage, a flow velocity value, and an angle of incidence of the flow relative to the obstacle upstream thereof. These nominal flow values may be written in a manual supplied with the fairing element, regardless of the form or medium of this manual: printed brochure, stored on a data medium such as electronic memory or an optical or magnetic storage disc, etc. Equivalently, these nominal values may be accessed via a site link or address enabling remote access, which is provided with the fairing element. Furthermore, these nominal values may be presented in any form: numerical values, graphs, charts, conditions and/or parameters and/or operating regime of the turbomachine through which the flow passes, etc.

The fairing element has a suction surface and a pressure surface, as well as a leading edge which forms a joining edge between the suction and pressure surfaces, and which is intended to be located upstream of the obstacle in relation to the flow.

According to the invention, the suction surface has a shape suitable for producing, within a portion of the fluid which flows along this suction surface in accordance with the nominal values, relative pressure variations which are less than 5% in absolute values, of a fluid pressure value in the flow which exists at the leading edge. These pressure variations are determined between any two points on the suction surface which are located between the leading edge and a zone of the fairing element called transition zone, where a local thickness of the fairing element between the suction and pressure surfaces is between 50% and 100% of a maximum thickness of the obstacle, these thicknesses being measured transversely to the flow.

Put another way, the invention dedicates part of the suction surface of the fairing element, upstream of its transition zone, to reducing the alterations in the pressure field that the fairing element could cause. Another part of the suction surface, downstream of the transition zone, can also be dedicated to the production of another function by the fairing element, such as a flow-straightening function. The transition zone then constitutes a connection, preferably continuous, between the upstream and downstream parts of the suction surface.

The suction surface is thus designed to cause reduced spatial pressure variations within the flow, at least in a part of this suction surface which is between the leading edge and the transition zone. In this manner, the fairing element only causes limited alterations to the pressure field in the flow, in the direction upstream of this fairing element. There is therefore little disruption to the operation of a rotor which may be arranged immediately preceding the fairing element relative to the flow direction. For the same reason, acoustic emissions which could result from such a juxtaposition of rotor with fairing element are reduced by the invention.

Preferably, the relative variations in pressure which are produced within the portion of the fluid which flows along the suction surface, between any two points of this suction surface which are located between the leading edge and the transition zone, can be less than 3%, or even less than 2%, in absolute values, of the fluid pressure value which exists at the leading edge.

Within the meaning of the invention, suction surface is understood to mean the one of the two flow guide surfaces on each side of the fairing element, on which the flow produces negative pressure relative to the other guide surface. When the invention is used, this suction surface can be concave or convex between the leading edge and the transition zone, along a streamline of the flow which follows the suction surface. The other flow guide surface of the fairing element, which is opposite to its suction surface, is the pressure surface.

In general for the invention, the shape of the suction surface can vary between different streamlines which pass over the leading edge along this suction surface. In other words, curvature values of the suction surface can be different between two streamlines which cross the leading edge at different points of this leading edge, the curvature values being measured in planes that are parallel to the streamlines and perpendicular to the suction surface. The suction surface can thus be a warped- or non-developable-surface between the leading edge and the transition zone. In this manner, it is possible to adapt the upstream part of the suction surface, which is between the leading edge and the transition zone, according to variations that may exist in the direction of incidence of the flow on the leading edge of the fairing element.

Again in general for the invention, at least part of the suction surface, which is located downstream of the transition zone, and the pressure surface can have respective shapes which are suitable for producing a change in inclination of the flow between two zones of the passage which are located respectively upstream and downstream of the fairing element. In other words, the fairing element can have an additional function of diverting or straightening the flow.

A second aspect of the invention relates to a turbomachine comprising a rotor, a stator, and a passage for the flow of gas which passes through the rotor and the stator, this turbomachine further comprising at least one obstacle which extends across the passage, and at least one fairing element which is in accordance with the first aspect of the invention and which surrounds the obstacle.

In preferred embodiments of the invention, the stator may comprise a plurality of flow-straightening vanes which are angularly distributed around an axis of the stator, and may further comprise the at least one fairing element. In this case, the suction and pressure surfaces of each fairing element of the stator have respective shapes which are adapted to produce a change in the inclination of flow between the zones of the passage which are upstream and downstream of the fairing element. In addition, the straightening vanes of the stator, in addition to being angularly offset around the stator axis, can be progressively offset either parallel to the stator axis, i.e. axially, or along radial directions perpendicular to the stator axis, i.e. radially, or each according to a combination of an offset parallel to the stator axis and another offset along a radial direction perpendicular to this stator axis, between the pressure surface of a fairing element of the stator and the suction surface of the next fairing element of the stator when going progressively around the stator axis.

The turbomachine may in particular be of one of the following types:
  an aircraft turbomachine, including a turbojet engine, a turbofan engine, or a turbine engine with centrifugal compressor,
  a wind tunnel turbomachine, or
  a turbomachine intended to produce electrical energy,
where the fairing element is located at a compressor of the turbomachine, or between the compressor and a combustion zone of the turbomachine, or at a turbine of the turbomachine downstream of the combustion zone, or in a secondary gas passage downstream of a fan intended to be rotated by the turbomachine.

Finally, a third aspect of the invention proposes a method for manufacturing a fairing element intended for placement in a passage for the flow of a fluid, and intended to surround an obstacle which crosses the passage so that the fairing element guides the flow of the fluid on two opposite sides of the obstacle. The method of the invention comprises the following steps:
  /1/ collecting nominal values of several parameters of the flow, including at least a density of the fluid, respective variations in cross-sectional area and in mean radius of the passage along the flow, a direction of flow in the passage, a flow velocity value, and an angle of incidence of the flow relative to the obstacle upstream thereof;
  /2/ determining a suction surface and a pressure surface of the fairing element, with a leading edge which forms a joining edge between the suction and pressure surfaces, and which is intended to be located upstream of the obstacle relative to the flow; and
  /3/ manufacturing the fairing element in accordance with the suction and pressure surfaces determined in step /2/.

According to the invention, a shape of the suction surface is determined in step /2/ so as to produce, within a portion of the fluid which flows along this suction surface in accordance with the nominal values collected in step /1/, pressure variations which are less than 5% in absolute values, of the fluid pressure value in the flow which exists at the leading edge, when the pressure variations are determined between any two points on the suction surface which are located between the leading edge and a zone of the fairing element called the transition zone, where a local thickness of the fairing element between the suction and pressure surfaces is between 50% and 100% of a maximum thickness of the obstacle, these thicknesses being measured transversely to the flow.

Such a method allows manufacturing a fairing element which is in accordance with the first aspect of the invention.

In particular, the shape of the suction surface as determined in step /2/ can result from a combination of several convexity contributions along streamlines, in its part located between the leading edge and the transition zone, these including:
 a first convexity contribution, which is an increasing function of a reduction in cross-sectional area of the passage along the flow; and
 a second convexity contribution, which is another increasing function of an increase in mean radius of the passage along the flow.

In practice, in step /2/, an upstream part of the suction surface of the fairing element, which is located between the leading edge and the transition zone, can be determined as follows:
 /a/ first determining a trace in the passage for the flow of the fluid, to connect two opposite walls which delimit this flow passage, the determined trace being intended to be superimposed on the leading edge of the fairing element;
 /b/ for each point of the trace, a direction of a vector velocity of the flow at this point, in accordance with the nominal values of the flow parameters, constitutes a direction which is tangent to the suction surface of the fairing element at the leading edge; and
 /c/ the suction surface of the fairing element is then extended step by step from the leading edge to the transition zone, so as to remain tangent at each point to the vector velocity of the flow at the same point, when the flow is still in accordance with the nominal values of the parameters, the upstream part of the suction surface thus being constructed all the way to the transition zone.

To complete the determination of the fairing element, step /2/ may further comprise:
 /d/ determining a shape of the suction surface in the transition zone, as well as a downstream part of the suction surface which is located on a side of the transition zone that is opposite to the upstream part of the suction surface, and also a pressure surface of the fairing element, so as to surround the obstacle.

Preferably, the nominal values of the flow parameters of the fluid are defined by an identified flow of this fluid in the flow passage when this flow passage does not comprise any obstacle or fairing element.

The fairing element manufactured in accordance with this third aspect of the invention can be intended for incorporation in a turbomachine according to the second aspect of the invention.

BRIEF DESCRIPTION OF FIGURES

The features and advantages of the invention will become more clearly apparent from the following detailed description of some non-limiting embodiments, with reference to the appended figures, which include:
FIG. 3b is a perspective view of a fairing element of the embodiment of the invention of FIG. 3a.

DETAILED DESCRIPTION OF THE INVENTION

For clarity sake, the dimensions of the elements represented in these figures correspond neither to actual dimensions nor to actual dimensional ratios. Furthermore, identical references indicated in different figures designate elements which are identical or which have identical functions.

Figure 1:
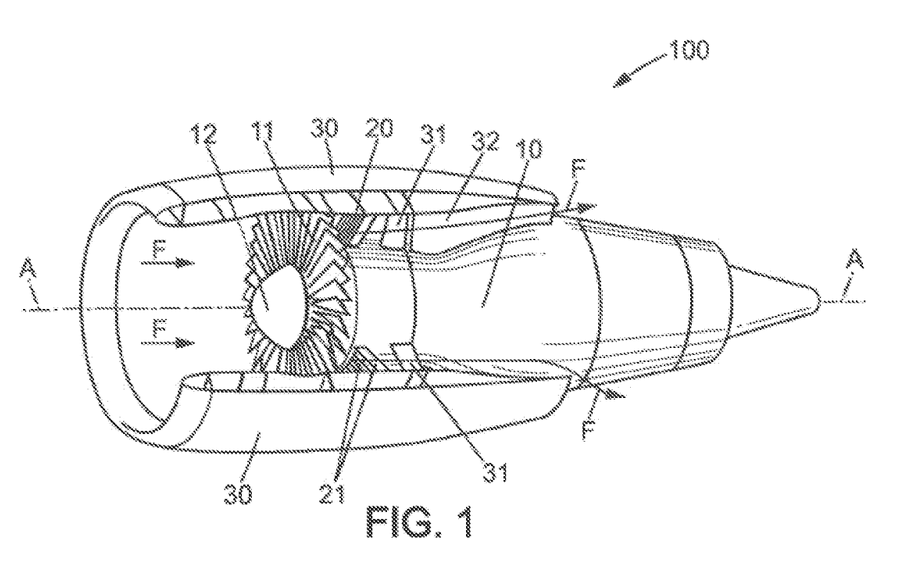
FIG. 1 is a general view of an aircraft engine in which the invention can be used.

In accordance with FIG. 1, an aircraft turbomachine 100 of the turbofan type comprises a central engine part 10, a fan 11 which is rotated by central engine part 10 while being mounted on a rotor 12, a stator 20, a peripheral fairing 30 which surrounds fan 11 and stator 20, and several arms 31 which each connect peripheral fairing 30 to central motor part 10. Each arm 31 contributes to rigidly holding peripheral fairing 30, and for this reason is called a pylon or structural arm. It has appropriate dimensions, in particular a tangential thickness, i.e. measured tangentially to the rotation of fan 11, to ensure rigid support of peripheral fairing 30, while avoiding the transmission of excessive vibrations between central engine part 10 and peripheral fairing 30. The thickness of each arm is commonly between 25 mm (millimeters) and 150 mm. An air flow F which is propelled by fan 11, commonly called a secondary air flow, travels between central engine part 10 and peripheral fairing 30, on either side of each arm 31. It is then essential that each arm 31 does not interfere with the flow of secondary air flow F, or interferes with it as little as possible. The same technical problem of reducing disruptions in the flow of secondary air flow F also concerns one or more flow separators 32 which may also be present between central engine part 10 and peripheral fairing 30.

Stator 20 is located between fan 11 and arms 31 along the flow of secondary air flow F. Its function is to reduce or eliminate a tangential component in the velocity of secondary air flow F which was generated by fan 11. In other words, the function of stator 20 is to straighten flow F. In a known manner, stator 20 comprises a plurality of stationary vanes 21, or OGV for "outlet guide vane", which are angularly distributed around axis of rotation A-A of fan 11. Each vane 21 of stator 20 has two guiding surfaces which are opposite to each other and connected by a leading edge, said edge being oriented towards the upstream of secondary air flow F. In cross-sections of each vane 21, the leading edge forms the apex of an angle of convergence of the two guiding surfaces of the vane. The guiding surfaces of each vane 21 thus tangentially guide two portions of secondary air flow F which pass on each side of this vane. One of the two guiding surfaces is a suction surface, and the other guiding surface is a pressure surface.

It is known that each arm 31 or separator 32 which is located at a distance from stator 20, separately from vanes 21 of the stator, causes distortion in the velocity and pressure fields of secondary air flow F which extends upstream of the air flow all the way to fan 11. Such distortions in air flow F are then likely to interfere with the operation of turbomachine 100. More particularly, the distortion in the velocity and pressure fields of secondary air flow F can degrade the performance of turbomachine 100, in particular its efficiency and its operability, can reduce its mechanical resistance, and can increase the noise pollution generated by fan 11. In addition, the bulk due to arms 31 and/or to separators 32, when these arms or separators are independent of stator 20, contributes to increasing the total length of turbomachine 100, and therefore its weight.

A method that has been considered for reducing such disruptions caused by arms 31 or separators 32 consists of merging a vane 21 with an arm 31, by adding an intermediate bridging segment. However, in the existing embodiments of such a flow-straightening element combined with the fairing function of a structural arm, the upstream part of this element still generates distortions in the velocity and pressure fields of the flow which are likely to interfere with the operation of fan 11.

Figure 2A:
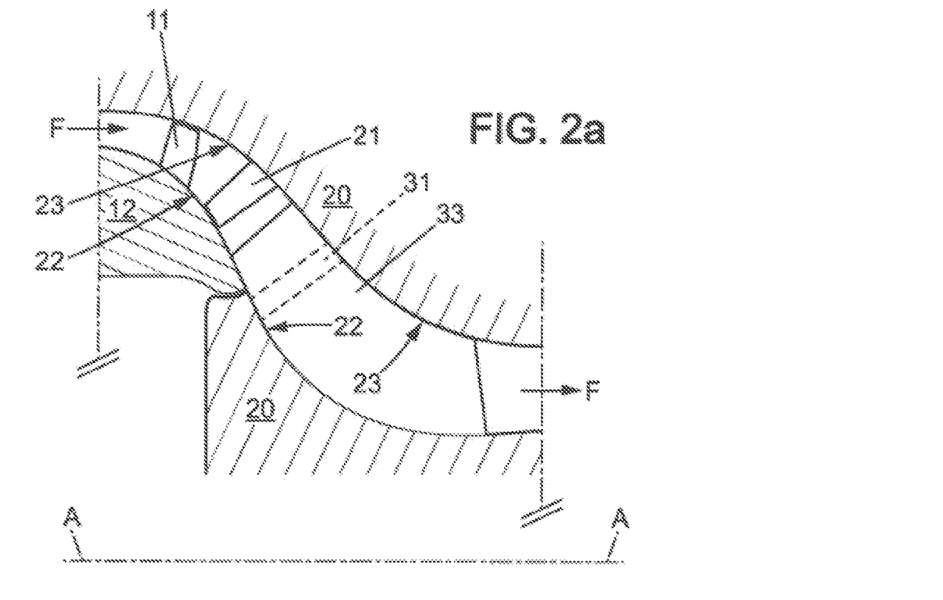
FIG. 2a is a sectional view of a stator with an axial configuration, to which the invention can be applied.
Figure 2B:
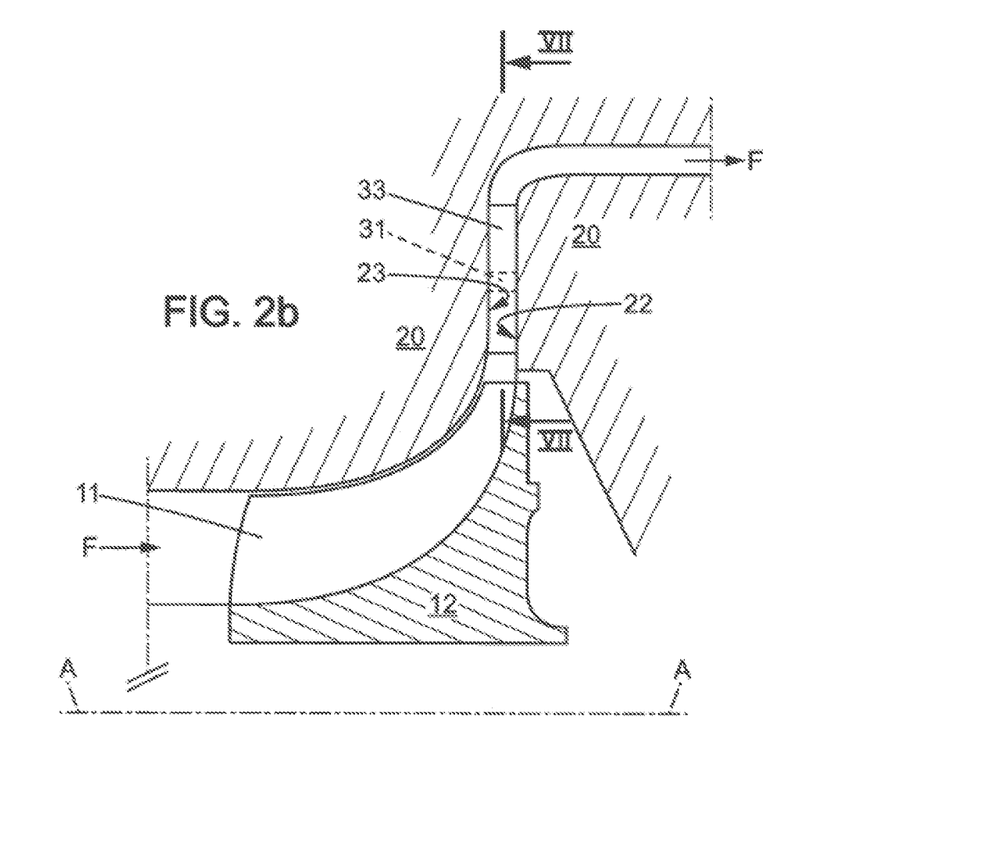
FIG. 2b corresponds to FIG. 2a for a stator with a radial configuration, to which the invention can also be applied.

Although the use of such an element having the combined functions of flow straightening and obstacle fairing has just been described in the context of a turbofan stator, similar uses can be implemented in a compressor of turbomachine 100, or between the compressor and the combustion zone of turbomachine 100, or even in a turbine thereof. The nature of the obstacle as well as the configuration of the passage for flowing air can vary according to each use. Examples of obstacles have already been given in the general part of this description. For a stator of a fan, of a compressor, or of a turbine, the aeraulic flow is slightly inclined locally relative to the rotor axis. On the other hand, in the case of a centrifugal compressor stator, the aeraulic flow can be radially divergent. FIG. 2a and FIG. 2b illustrate these two types of configurations, respectively referred to as axial and radial. In general, the reference 11 designates the vanes of rotor 12, A-A designates the common axis of rotor 12 and of stator 20, and the references 22 and 23 designate the two opposite walls which delimit the air flow passage at stator 20. Vanes 21 of stator 20 are therefore substantially perpendicular to the two walls 22 and 23, as are the fairing element surfaces of the invention which are integrated into stator 20. The reference 31 designates an obstacle which is located in flow F, and the reference 33 designates a fairing element which is in accordance with the invention and which surrounds obstacle 31. In the following, a cylindrical coordinate system is used whose plane in polar coordinates is perpendicular to axis A-A, and the Cartesian coordinate axis is superimposed on axis A-A. Thus, the axial direction is that of axis A-A, and any radial direction intersects axis A-A perpendicularly while being identified by an angle θ around axis A-A according to the polar coordinate system.

Figure 3A:
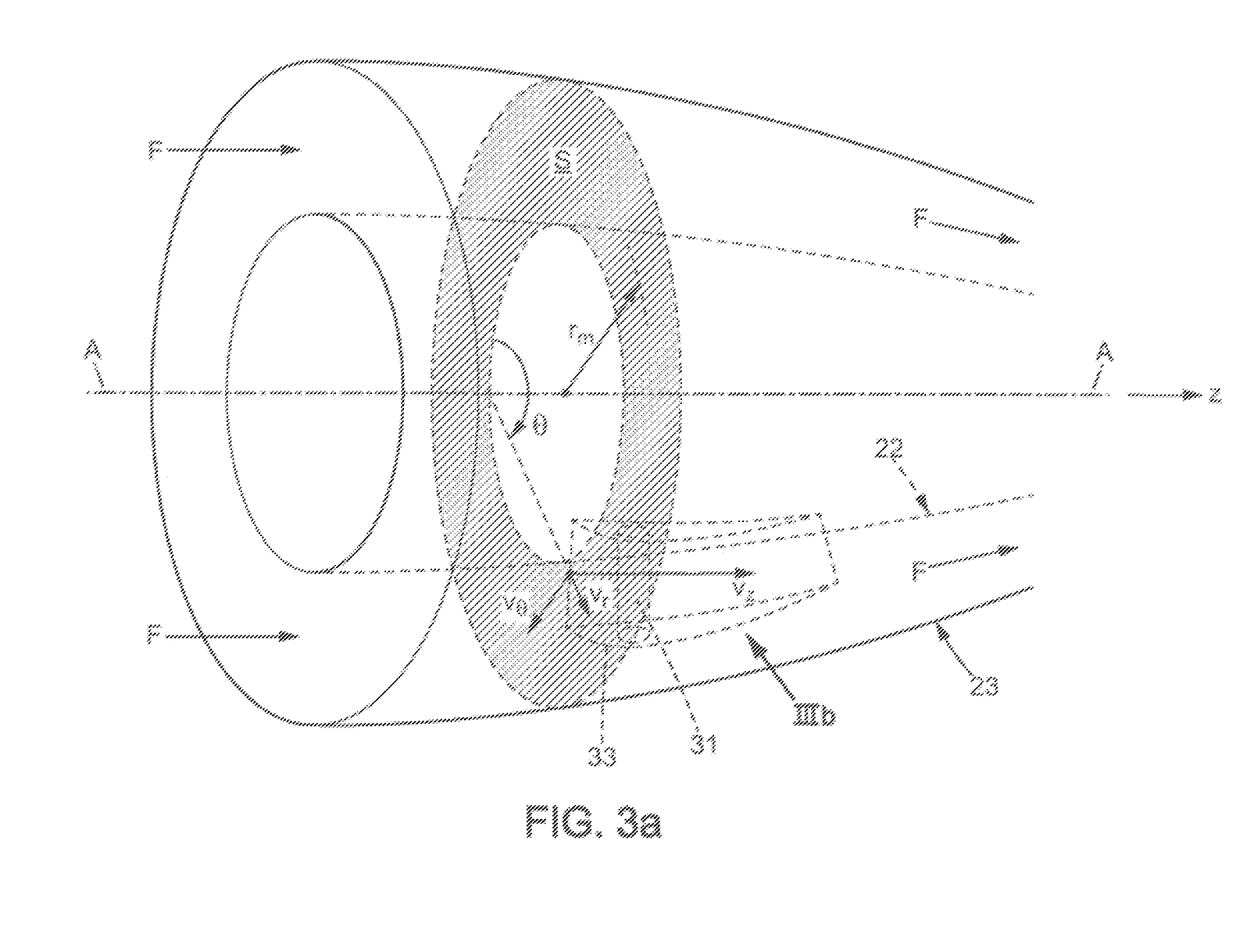
FIG. 3a is a perspective view of an embodiment of the invention for a stator with an axial configuration.
Figure 3B:
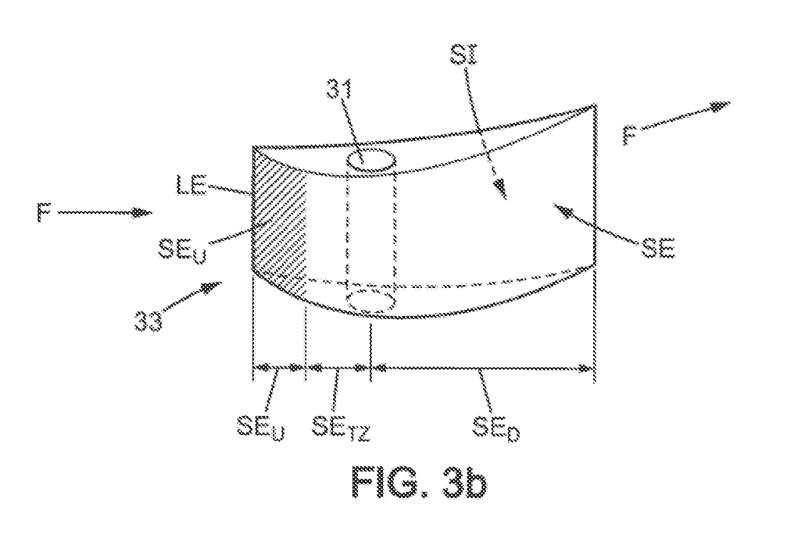

The invention is now presented in the case of an axial configuration, with reference to FIG. 3a and FIG. 3b. Usually, the passage cross-sectional area for flow F in a cutting plane which is perpendicular to axis A-A designates the surface area comprised between walls 22 and 23 inside this plane. This can vary as the cutting plane is moved along axis A-A, increasing or decreasing depending on the design of turbomachine 100. Independently and simultaneously, the average passage radius for flow F, measured radially from axis A-A, can also increase or decrease when moving the cutting plane along axis A-A. In FIG. 3a, the passage cross-sectional area is denoted by S and the average passage radius is denoted by $r_m$.

The other notations that are used in FIG. 3b have the following meanings:
- LE: leading edge of each fairing element 33
- SE: suction surface of each fairing element 33
- SI: pressure surface of each fairing element 33
- $SE_U$: upstream part of each suction surface SE
- $SE_D$: downstream part of each suction surface SE
- $SE_{TZ}$: transition zone of each suction surface SE.

Nominal values of flow F at stator 20 are defined by the air flow resulting from an identified operating regime for turbomachine 100, when stator 20 does not include fairing element 33. These nominal values, which characterize a flow regime taken as a reference, determine in particular the velocity of the air at an upstream end of a fairing element intended to be incorporated into stator 20, with the orientation of this velocity, for each point of the corresponding passage cross-sectional area. This air velocity has an axial component, $v_z$, which is parallel to axis A-A, a radial component, $v_r$, which is oriented radially and perpendicularly to axis A-A, and a tangential component, $v_θ$, which is oriented perpendicularly to the axial and radial directions at the location where this velocity is characterized.

According to the invention, upstream part $SE_U$ of suction surface SE of a fairing element 33 which is arranged in the flow passage can be determined as follows:
/a/ a trace is first determined in the flow passage, to connect walls 22 and 23, intended to be superimposed on leading edge LE of fairing element 33;
/b/ for each point of this trace, a direction of the vector velocity of flow F at this point, in accordance with the nominal values of this flow, constitutes a direction which is tangent to suction surface SE of fairing element 33 at leading edge LE;
/c/ suction surface SE of fairing element 33 is then extended step by step from its leading edge LE to its transition zone $SE_{TZ}$, so as to remain tangent at each point to the vector velocity of flow F at the same point, when this flow is still in accordance with the nominal values. Upstream part $SE_U$ of suction surface SE is thus constructed all the way to transition zone $SE_{TZ}$; then
/d/ downstream part $SE_D$ of suction surface SE, as well as transition zone $SE_{TZ}$ between downstream part $SE_D$ and upstream part $SE_U$ of suction surface SE as constructed in step /c/, and also pressure surface SI, are determined so as to surround obstacle 31.

The inventors have found that constructing the upstream part of the suction surface in accordance with steps /a/ through /c/ reduces the alteration of the flow pressure field which is caused by the fairing element, compared to the nominal values. In addition, this reduction is sufficient when the construction is extended to a dimension on axis A-A where the thickness of the fairing element, as completed in step /d/, is at least equal to 50% of the thickness of the obstacle.

The inventors have also discovered that this construction of the upstream part of the suction surface guaranteed that the air pressure in the flow, in the presence of the fairing element, remains substantially identical on the upstream part of the suction surface to its values in the absence of the fairing element and obstacle, when the flow production conditions are identical to those for the nominal values. An upper limit of 5%, preferably 3% or more preferably 2%, for the pressure variations which exist in the upstream part of the suction surface compared to the nominal pressure value on the leading edge, guarantees that the disruptions caused by the fairing element upstream thereof are not a problem, even when a rotor is arranged upstream of the fairing element while being close thereto.

The inventors have also discovered that the evolution of passage cross-sectional area S and of mean radius $r_m$ as a function of dimension z on axis A-A, at the location of the upstream part of the suction surface, determines the curvature of this upstream part of the suction surface along the streamlines. In particular, the convexity of the upstream part of the suction surface increases as passage cross-sectional area S decreases in the direction of flow F at the location of this upstream part of the suction surface. This first variation results from a conservation of flow rate for flow F parallel to axis A-A.

In addition, the convexity of the upstream part of the suction surface increases as the average passage radius $r_m$ increases in the direction of flow F at the location of this upstream part of the suction surface. This second variation results from a conservation of angular momentum for flow F while moving parallel to axis A-A, when it has a non-zero rotational component upstream of the fairing element.

In fact, the two variations in the convexity of suction surface SE in its upstream part $SE_U$ combine with each other, and possibly also with other contributions which result from different causes, for example such as a variation in air temperature parallel to axis A-A, or effects of air viscosity. Thus, steps /b/ and /c/ indicated above allow optimizing the upstream part of each suction surface to take into account the variations in passage cross-sectional area and in average passage radius which may be present in this upstream part of the suction surface.

Figure 4:
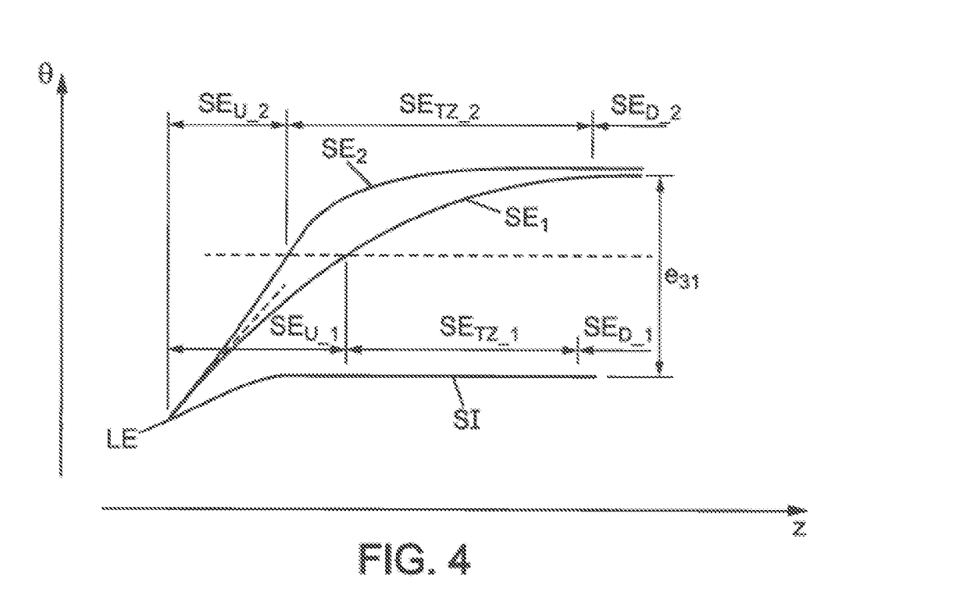
FIG. 4 shows cross-sections of the upstream parts of two fairing elements in accordance with the invention.

FIG. 4 is a diagram which superimposes the cross-sections of two fairing elements in accordance with the invention, as these sections appear in a cylindrical surface of axis A-A. The horizontal axis of this diagram is the z axis, and the vertical axis is the polar angle θ. The two fairing elements have the same leading edge LE and the same pressure surface SI. The references which separately relate to the suction surface of each fairing element are respectively supplemented by the index 1 or the index 2. Suction surface $SE_1$ of the first fairing element is convex in its upstream part, denoted $SE_{U\_1}$, corresponding to a predominant effect of a reduction in passage cross-sectional area S, whereas suction surface $SE_2$ of the second fairing element is concave in the corresponding upstream part of the suction surface, denoted $SE_{U\_2}$. The second fairing element corresponds to a predominant effect of a reduction in the average passage radius $r_m$. The two upstream parts of suction surfaces $SE_{U\_1}$ and $SE_{U\_2}$ which are represented in FIG. 4 correspond to the same direction of incidence of flow F at leading edge LE, as indicated by the straight segment represented by a dashed line. This direction of incidence is the one stipulated by the nominal values for flow F. For these two examples, the boundary between upstream part $SE_{U\_1}$ (respectively $SE_{U\_2}$) and transition zone $SE_{TZ\_1}$ (resp. $SE_{TZ\_2}$) of suction surface $SE_1$ (resp. $SE_2$) is chosen to correspond to approximately 60% of angular thickness $e_{31}$ of the obstacle 31 intended to be contained in each fairing element. Depending on the design of turbomachine 100 to which the invention is applied, and depending on the nature of obstacle 31, its thickness can vary between a few millimeters and 150 mm. As is apparent in FIG. 4, the upstream part of suction surface $SE_{U\_2}$ is shorter than that of $SE_{U\_1}$, parallel to axis A-A. The longitudinal bulk of a fairing element which possesses suction surface $SE_2$ can therefore be reduced, compared to the use of suction surface $SE_1$. This reduction in the length of the fairing element, which is provided by the concavity of the upstream part of the suction surface, is combined with another possible reduction in the total length of the turbomachine which results from merging a stator vane with the fairing element that surrounds the obstacle.

Figure 5:
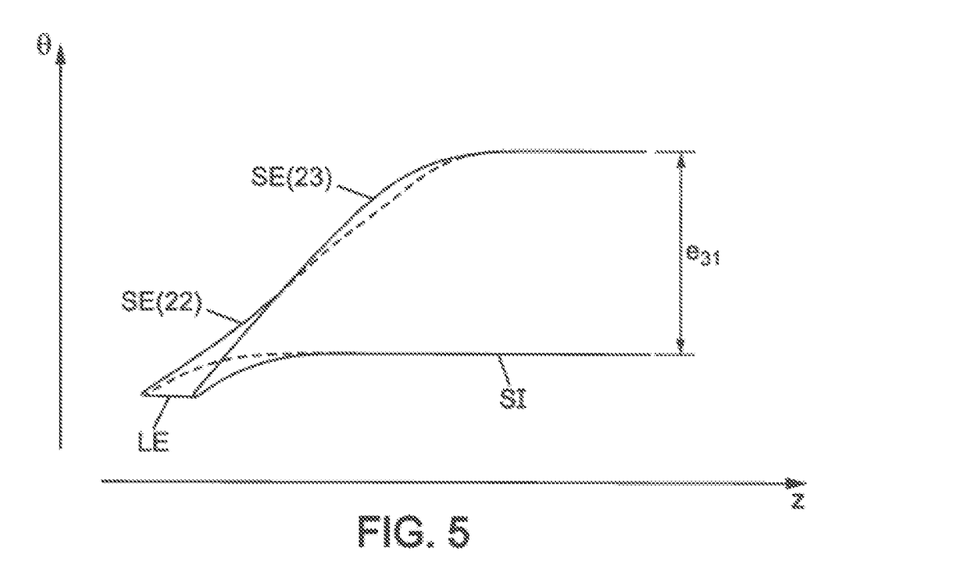
FIG. 5 shows two cross-sections of a same fairing element in accordance with the invention.

For a fairing element according to the invention, step /b/ indicated above is carried out separately from several points on leading edge LE. The curvature resulting from step /c/ for the upstream part of suction surface $SE_U$ can then vary between the streamlines of flow F which pass through different points of leading edge LE, for the same fairing element. FIG. 5 thus shows two suction surface profiles for a same fairing element according to the invention: one designated by SE(22) to be used at wall 22, and the other designated by SE(23) to be used at wall 23. FIG. 5 also shows that leading edge LE is further downstream in flow F at wall 23 than at wall 22. In addition, the upstream part of the suction surface at wall 22 is slightly convex while it is slightly concave at wall 23. The upstream part of suction surface $SE_U$ is then a non-developable surface. The horizontal and vertical axes of FIG. 5 are the same as those of FIG. 4, and pressure surface SI is the same at the two walls 22 and 23.

A fairing element 33 according to the invention can be isolated within turbomachine 100, for example to surround a starter drive train between an electric starter motor which is located outside wall 23 and the rotor 12 which is located inside wall 22.

Alternatively, a fairing element 33 in accordance with the invention can be integrated into a turbomachine stator which is arranged downstream of a ring of rotor blades. Such a stator produces a flow-straightening function. Stator 20 of FIG. 6 has an axial configuration, and is provided with a plurality of vanes 21 which are angularly stepped around axis A-A. According to the invention, stator 20 can further be provided with fairing element 33 as described above, or provided with several such fairing elements 33. For example, eight fairing elements 33 can be equiangularly distributed in stator 20, among its vanes 21. Several vanes 21, for example twelve vanes 21, can be provided between two fairing elements 33 which are angularly successive around axis A-A within stator 20. Each fairing element 33 has the primary function of surrounding an obstacle 31 to which this fairing element is dedicated. To achieve this, and with the aim of scarcely disrupting or disrupting as little as possible the pressure field at rotor 12, each suction surface SE is designed in accordance with the invention, for its upstream part $SE_U$. Its downstream part $SE_D$ is then designed to produce the flow-straightening function in coordination with vanes 21.

Figure 6:
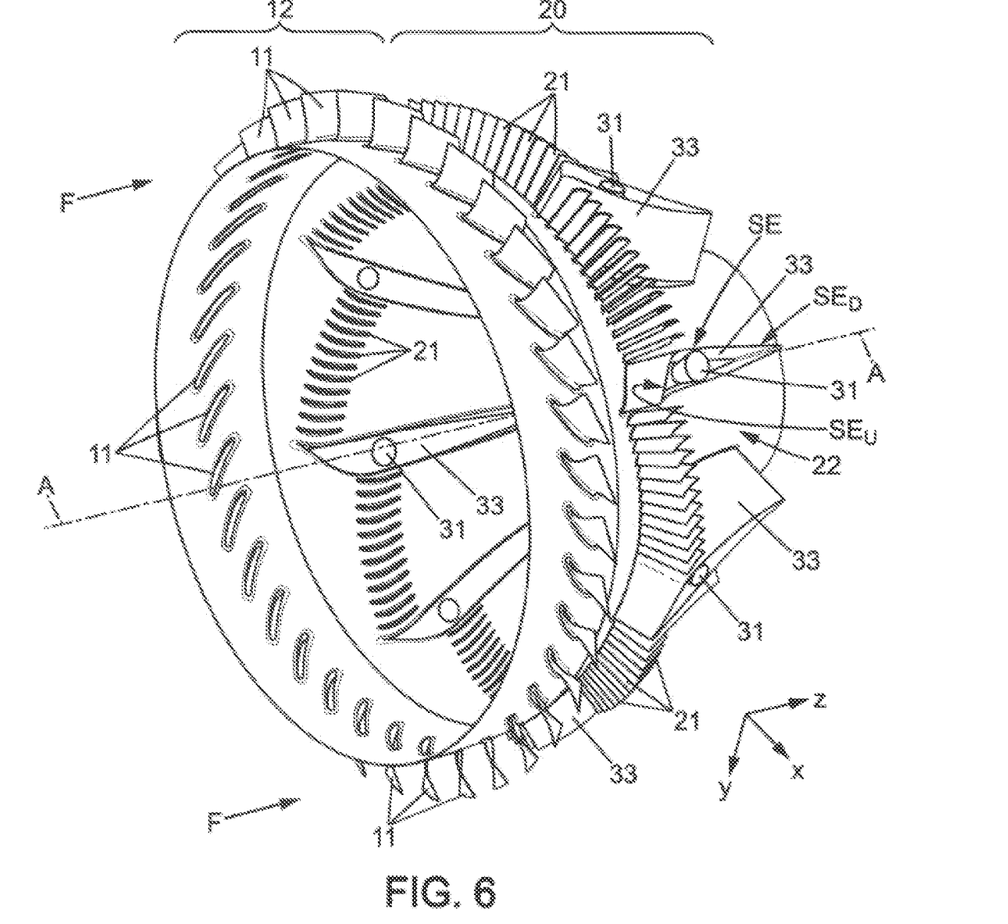
FIG. 6 is a perspective view of a rotor-stator assembly with an axial configuration, its rotor incorporating fairing elements in accordance with the invention.

Preferably, successive vanes 21 of stator 20 can be axially offset in addition to being angularly offset, as can be seen in FIG. 6. Thus, two successive vanes 21 around axis A-A have at least the following two offset components between them: an angular offset component around axis A-A, and an axial offset component which is parallel to axis A-A. Thus, vanes 21 of a same series which is between two fairing elements 33 can be aligned obliquely between an upstream part of pressure surface SI of one of these two fairing elements 33, close to its leading edge LE, and a part, which is further downstream in flow F, of suction surface SE of the other fairing element 33, for example its transition zone $SE_{TZ}$.

In particular, in a case where the passage for flow F has a variation in its mean radius $r_m$ at stator 20, vanes 21 of a same series which is between two fairing elements 33 can also have an offset between two successive vanes according to an additional offset component which is radial. When walls 22 and 23 are locally conical in the same direction, such a radial offset component can be a consequence of the axial offset component, as can be seen in FIG. 6.

For comparison, the use of stator 20 of FIG. 6 instead of a prior art stator as known prior to the present invention, has made it possible to reduce the unsteady forces exerted on rotor 12 by 75%, and to improve the overall efficiency of the compressor by 1%. In the prior art stator used as a reference for this comparison, the fairing elements which surround obstacles 31 are not merged with some of vanes 21 of this prior art stator, and the upstream parts of the suction surfaces of the fairing elements have no curvature as provided by the invention. From such a prior art stator, merging the fairing elements with some of vanes 21 of stator 20, using upstream parts of the suction surfaces which are flat for these fairing elements, only reduces the unsteady forces exerted on rotor 12 by 35%, and simultaneously only reduces the overall efficiency of the compressor by 0.5%.

Once it is geometrically designed according to the invention, each fairing element, or a stator which incorporates at least one, can be manufactured according to one of the methods known to those skilled in the art which is appropriate for the location where the fairing element(s) concerned is/are located within the turbomachine.

Figure 7:
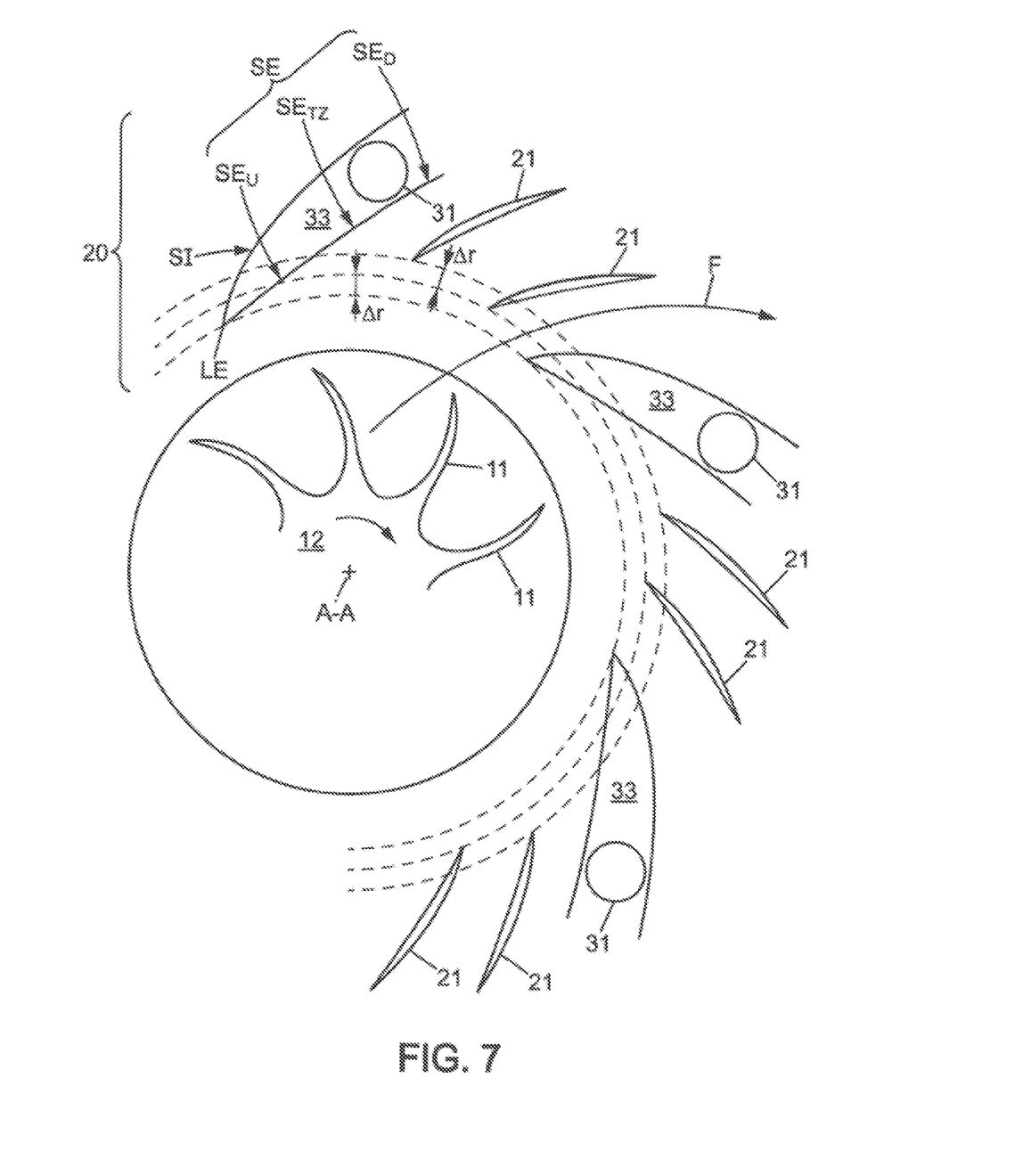
FIG. 7 is a diagram of an embodiment of the invention for a stator with a radial configuration.

The invention can also be applied to a stator which has a radial configuration, for example as represented in FIG. 2b. Such a configuration is used for example in a low-pressure compressor, in particular a compressor of a small turboshaft engine. In this case, stator 20 forms a peripheral ring which is arranged radially around rotor 12, coaxially with said rotor along axis A-A. As illustrated by FIG. 7 which is a view in a plane perpendicular to axis A-A, stator 20 may comprise several fairing elements 33 which are angularly distributed around axis A-A, each around a different obstacle 31. The cutting plane of FIG. 7 is indicated in FIG. 2b. Leading edge LE of each element of fairing element 33 can then be substantially parallel to axis A-A, and its upstream part of suction surface $SE_U$ is in accordance with the invention. As before, several flow-straightening guides 21, for example two guides 21, can be interposed within stator 20 in a radial configuration between two fairing elements 33 which are in succession around axis A-A. These two guides 21 can then have progressive radial offsets Δr, for example from leading edge LE of one of fairing elements 33 towards transition zone $SE_{TZ}$ of suction surface SE of the next fairing element 33.

It is understood that the invention can be reproduced by modifying secondary aspects of the embodiments described in detail above, while retaining at least some of the cited advantages. In particular, recall that the invention is applicable to any fairing element which is arranged in a passage for fluid, regardless of the turbomachine which incorporates this passage for fluid and regardless of the location of this fairing element within this machine. In particular, it is particularly advantageous for fairing elements which are located in the primary circuit or in the secondary circuit of aircraft turbomachines.

The invention claimed is:

1. A fairing element intended for placement in a passage for flow of a fluid, and for surrounding an obstacle which crosses the passage so that the fairing element guides the flow of fluid on two opposite sides of the obstacle,
    the fairing element being designed for nominal values of several parameters of the flow, including at least a density of the fluid, respective variations in cross-sectional area and in mean radius of the passage along the flow, a direction of flow in the passage, a flow velocity value, and an angle of incidence of the flow relative to the obstacle upstream of said obstacle,
    the fairing element having a suction surface and a pressure surface, and a leading edge which forms a joining edge between the suction and pressure surfaces, and which is intended to be located upstream of the obstacle in relation to the flow,
    wherein the suction surface has a shape suitable for producing, within a portion of the fluid which flows along said suction surface in accordance with the nominal values, pressure variations which are less than 5% in absolute values, of a fluid pressure value in the flow which exists at the leading edge, when said pressure variations are determined between any two points on the suction surface which are located between the leading edge and a zone of the fairing element called transition zone, where, along the transition zone, a local thickness of said fairing element between the suction and pressure surfaces varies between 50% and 100% of a maximum thickness of the obstacle, said thicknesses being measured transversely to the flow.

2. The fairing element according to claim 1, wherein the suction surface is concave or convex between the leading edge and the transition zone, along a streamline of the flow which follows said suction surface.

3. The fairing element according to claim 1, wherein curvature values of the suction surface are different between two streamlines which cross the leading edge at different points of said leading edge, said curvature values being measured in planes that are parallel to the streamlines and perpendicular to the suction surface.

4. The fairing element according to claim 1, wherein at least part of the suction surface, which is located downstream of the transition zone, and the pressure surface have respective shapes which are suitable for producing a change in inclination of the flow between a first zone of the passage upstream of the fairing element and a second zone of the passage downstream of said fairing element.

5. The fairing element according to claim 1, wherein the shape of the suction surface is adapted so that the pressure variations produced within the portion of the fluid which flows along said suction surface, between any two points on the suction surface which are located between the leading edge and the transition zone, are less than 3%, in absolute values, of the pressure value of the fluid in the flow which exists at the leading edge.

6. A turbomachine comprising:
    a rotor;
    a stator;
    a passage for a flow of gas which passes through the rotor and the stator;
    at least one obstacle which is extends across the passage; and
    at least one fairing element which is in accordance with claim 1 and which surrounds the obstacle.

7. The turbomachine according to claim 6, wherein the stator comprises a plurality of flow-straightening vanes which are angularly distributed around an axis of the stator, and further comprises the at least one fairing element,
    wherein, for each said fairing element of the stator, at least part of the suction surface, which is located downstream of the transition zone, and the pressure surface have respective shapes which are suitable for producing a change in inclination of the flow between a first zone of the passage upstream of the fairing element and a second zone of the passage downstream of said fairing element, and wherein the straightening vanes of the stator, in addition to being angularly offset around the axis of said stator, are progressively offset either parallel to the axis of said stator, or along radial directions perpendicular to the axis of the stator, or each according to a combination of an offset parallel to the axis of the stator and another offset along a radial direction perpendicular to said axis of the stator, between the pressure surface of a fairing element of the stator and the suction surface of the next fairing element of the stator when going progressively around the axis of the stator.

8. The turbomachine according to claim 6, wherein the turbomachine is of one of the following types:
   an aircraft turbomachine, including a turbojet engine, a turbofan engine, or a turbine engine with centrifugal compressor,
   a wind tunnel turbomachine, and
   a turbomachine configured to produce electrical energy, and
   wherein the fairing element is located at a compressor of the turbomachine, or between the compressor and a combustion zone of the turbomachine, or at a turbine of said turbomachine downstream of the combustion zone, or in a secondary gas passage downstream of a fan which is configured to be rotated by said turbomachine.

9. A method for manufacturing a fairing element intended for placement in a passage for flow of a fluid, and intended to surround an obstacle which crosses the passage so that the fairing element guides the flow of the fluid on two opposite sides of the obstacle, the method comprising the following steps:
   collecting nominal values of several parameters of the flow, including at least a density 4 the fluid, respective variations in cross-sectional area and in mean radius of the passage along the flow, a direction of flow in the passage, a flow velocity value, and an angle of incidence of the flow relative to the obstacle upstream of said obstacle;
   determining a suction surface and a pressure surface of the fairing element, with a leading edge which forms a joining edge between the suction and pressure surfaces, and which is intended to be located upstream of the obstacle relative to the flow; and
   manufacturing the fairing element in accordance with the determined suction and pressure surfaces,
   wherein a shape of the suction surface is determined to produce, within a portion of the fluid which flows along said suction surface in accordance with the collected nominal values, pressure variations which are less than 5% in absolute values, of the fluid pressure value in the flow which exists at the leading edge, when said pressure variations are determined between any two points of said suction surface which are located between the leading edge and a zone of the fairing element called the transition zone, where, along the transition zone, a local thickness of said fairing element between the suction and pressure surfaces varies between 50% and 100% of a maximum thickness of the obstacle, said thicknesses being measured transversely to the flow.

10. The method according to claim 9, wherein the fairing member is designed for nominal values of several parameters of the flow, including at least a density of the fluid, respective variations in cross-sectional area and in mean radius of the passage along the flow, a direction of flow in the passage, a flow velocity value, and an angle of incidence of the flow relative to the obstacle upstream of said obstacle,
   the fairing element having a suction surface and a pressure surface, and a leading edge which forms a joining edge between the suction and pressure surfaces, and which is intended to be located upstream of the obstacle in relation to the flow,
   wherein the suction surface has a shape suitable for producing, within a portion of the fluid which flows along said suction surface in accordance with the nominal values, pressure variations which are less than 5% in absolute values, of a fluid pressure value in the flow which exists at the leading edge, when said pressure variations are determined between any two points on the suction surface which are located between the leading edge and a zone of the fairing element called transition zone, where, along the transition zone, a local thickness of said fairing element between the suction and pressure surfaces varies between 50% and 100% of a maximum thickness of the obstacle, said thicknesses being measured transversely to the flow.

11. The method according to claim 9, wherein the shape of the determined suction surface results from a combination of several convexity contributions along streamlines, in a part of said suction surface which is located between the leading edge and the transition zone, the convexity contributions including:
   a first convexity contribution, which is an increasing function of a reduction in cross-sectional area of the passage along the flow, and
   a second convexity contribution, which is another increasing function of an increase in mean radius of the passage along the flow.

12. The method according to claim 9, wherein, in the determining , an upstream part of the suction surface of the fairing element, which is located between the leading edge and the transition zone, is determined by:
   determining a trace in the passage for the flow of the fluid, to connect two opposite walls which delimit said flow passage, said trace being intended to be superimposed on the leading edge of the fairing element, for each point of the trace, a direction of a vector velocity of the flow at said point, in accordance with the nominal values of the flow parameters, constituting a direction which is tangent to the suction surface of the fairing element at the leading edge; and
   extending the suction surface of the fairing element step by step from the leading edge to the transition zone to remain tangent at each point to the vector velocity of the flow at said point, when the flow is still in accordance with the nominal values of the parameters, the upstream part of the suction surface thus being constructed all the way to the transition zone;
   determining a shape of the suction surface in the transition zone, a downstream part of the suction surface which is located on a side of the transition zone that is opposite to the upstream part of said suction surface, and a pressure surface of the fairing element, to surround the obstacle.

13. The method according to claim 9, wherein the nominal values of the flow parameters of the fluid are defined by an identified flow of said fluid in the flow passage when said flow passage does not comprise any obstacle or fairing element.

14. The method according to claim 9, wherein the fairing element is intended for incorporation in a turbomachine comprising a rotor, a stator, and a passage for a flow of gas which passes through the rotor and the stator, said turbomachine further comprising at least one obstacle which is extends across the passage, and at least one fairing element that surrounds the obstacle,
- wherein the fairing is intended for placement in a passage for flow of a fluid, and for surrounding the obstacle which crosses the passage so that the fairing element guides the flow of fluid on two opposite sides of the obstacle,
- the fairing element being designed for nominal values of several parameters of the flow, including at least a density of the fluid, respective variations in cross-sectional area and in mean radius of the passage along the flow, a direction of flow in the passage, a flow velocity value, and an angle of incidence of the flow relative to the obstacle upstream of said obstacle,
- the fairing element having a suction surface and a pressure surface, and a leading edge which forms a joining edge between the suction and pressure surfaces, and which is intended to be located upstream of the obstacle in relation to the flow,
- wherein the suction surface has a shape suitable for producing, within a portion of the fluid which flows along said suction surface in accordance with the nominal values, pressure variations which are less than 5% in absolute values, of a fluid pressure value in the flow which exists at the leading edge, when said pressure variations are determined between any two points on the suction surface which are located between the leading edge and a zone of the fairing element called transition zone, where, along the transition zone, a local thickness of said fairing element between the suction and pressure surfaces varies between 50% and 100% of a maximum thickness of the obstacle, said thicknesses being measured transversely to the flow.

15. The fairing element according to claim 2, wherein curvature values of the suction surface are different between two streamlines which cross the leading edge at different points of said leading edge, said curvature values being measured in planes that are parallel to the streamlines and perpendicular to the suction surface.

16. The fairing element according to claim 2, wherein at least part of the suction surface, which is located downstream of the transition zone, and the pressure surface have respective shapes which are suitable for producing a change in inclination of the flow between a first zone of the passage upstream of the fairing element and a second zone of the passage downstream of said fairing element.

17. The fairing element according to claim 3, wherein at least part of the suction surface, which is located downstream of the transition zone, and the pressure surface have respective shapes which are suitable for producing a change in inclination of the flow between a first zone of the passage upstream of the fairing element and a second zone of the passage downstream of said fairing element.

18. The fairing element according to claim 1, wherein the shape of the suction surface is adapted so that the pressure variations produced within the portion of the fluid which flows along said suction surface, between any two points on the suction surface which are located between the leading edge and the transition zone, are less than 2%, in absolute values, of the pressure value of the fluid in the flow which exists at the leading edge.

19. A turbomachine comprising:
- a rotor;
- a stator;
- a passage for a flow of gas which passes through the rotor and the stator;
- at least one obstacle which is extends across the passage; and
- at least one fairing element which is in accordance with claim 2 and which surrounds the obstacle.

20. A turbomachine comprising:
- a rotor;
- a stator;
- a passage for a flow of gas which passes through the rotor and the stator;
- at least one obstacle which is extends across the passage; and
- at least one fairing element which is in accordance with claim 3 and which surrounds the obstacle.

* * * * *